Jan. 19, 1943.   W. J. CULBERTSON   2,309,047
MOTION CONVERSION MECHANISM
Filed Oct. 17, 1941   4 Sheets-Sheet 1

Fig.1

INVENTOR
William J. Culbertson
by
Stebbins and Blenko
His Attys.

Jan. 19, 1943.   W. J. CULBERTSON   2,309,047
MOTION CONVERSION MECHANISM
Filed Oct. 17, 1941   4 Sheets-Sheet 2

INVENTOR
William J. Culbertson
by
Stebbins and Blenko,
His Attys.

Jan. 19, 1943.  W. J. CULBERTSON  2,309,047
MOTION CONVERSION MECHANISM
Filed Oct. 17, 1941  4 Sheets-Sheet 3

INVENTOR
William J. Culbertson
by
Stebbins and Olenko
His Attys.

Jan. 19, 1943.   W. J. CULBERTSON   2,309,047
MOTION CONVERSION MECHANISM
Filed Oct. 17, 1941   4 Sheets-Sheet 4

INVENTOR
William J. Culbertson
by
Stebbins and Blenko
His Attys.

Patented Jan. 19, 1943

2,309,047

UNITED STATES PATENT OFFICE 2,309,047

MOTION CONVERSION MECHANISM

William J. Culbertson, Brocton, Ill.

Application October 17, 1941, Serial No. 415,385

14 Claims. (Cl. 74—52)

This invention relates to mechanisms for the conversion of the reciprocating motion of a piston in a cylinder or other type of back-and-forth, straight-line motion into rotary motion or the converse, and is intended to supplant the time honored, orthodox system of "connecting-rod-and-crank" drive, now in common use in engines, pumps, compressors and other machines.

A general object of this invention is the provision of simplified, improved means of connecting the pistons of a radial cylinder type, or of an opposed cylinder type, or of an opposed-piston, single or double acting, opposed or tandem cylinder type engine, pump, compressor, etc., to the crankshaft.

A further object of this invention is the provision of a kind of driving gear mechanism, which makes possible the attainment of perfect balance and smooth running of all reciprocating and rotating parts of the complete engine through its entire speed range. Inasmuch as there are no parts of the drive mechanisms, having an oscillating, angular or irregular motion, the "error" in the piston's position, due to the obliquity of the connecting rod of the usual orthodox type of engine drive, is eliminated. All piston rods and other reciprocating members of this driving gear move with true harmonic motion.

The provision of thoroughly practical simplified driving gear mechanisms, such as those described herein, make possible the following improvements in an engine: permits the installation of stuffing boxes on the piston rods, between the crankcase and the cylinders, thereby completely isolating the one from the other, thus insuring controlled cylinder wall lubrication; prevents pollution of the crankcase by leakage from piston liquid cooling equipment; makes possible the complete isolation of the cylinder wall heat from the crankcase; all made possible without requiring the use of a cross-head, which adds materially to the length or height of the engine. Permits elimination of all oscillating, "hard to lubricate," wrist-pin bearing surfaces in the heated area directly under the piston head; simplifies the design of suitable apparatus for the liquid cooling of the piston head surfaces of large bore engines; permits reduction of the length of the piston, because of the elimination of all side thrust on said piston, to no more than is required for the piston to function as a ring carrier or interruptor, thus permitting the exposure of a large percentage of the heated cylinder wall surface, to the cooling effect of the scavenging air, etc. Completely eliminates that part of the power lost through friction, between the piston and cylinder wall surfaces, caused by the side thrust exerted on the ordinary trunk type piston, which is in common use. Obviates the necessity of employing widely separated crankshafts, connected by an idler gear train, or by a lay shaft and bevel gears, or by a silent chain, or by other means, now in common use in engines of the opposed-piston type; provides the first really simplified, practical driving gear for a double-acting, opposed-piston, co-axial cylinder type engine. Further objects and advantages will appear from the detailed description of the driving gear mechanisms, embodying the invention in the present preferred forms, hereinafter submitted; the description being considered in connection with the accompanying drawings.

These mechanisms are of the type in which one or more eccentric sheaves are fixed to a sleeve and rotatably mounted upon the crank pin of a crankshaft, straps on the eccentric sheaves being connected, through piston rods or otherwise, to the reciprocating members, the throws of the crank and eccentric sheaves all being made equal and the movement of the eccentric sheaves with respect to the crankshaft so constrained that the center points of all of the eccentric sheaves move in straight-line paths, which pass through the axis of crank rotation.

It has been known for many years that, if the eccentric sheaves, including the sleeve upon which they are eccentrically mounted, are constrained in some positive manner, such as will force or require them to rotate around the crank pin, in the opposite direction of rotation from, but with the same absolute angular velocity as, the crank pin rotates about the crankshaft axis, then the center points of the eccentric sheaves and of the eccentric straps operatively mounted thereon will move with a reciprocatory, harmonic motion in rectilinear paths, which pass through the axis of crank rotation, the extent of this straight-line travel, back-and-forth across the crank axis, being equal to four times the throw of the crank.

Geometrically, this action or method of transformation of motion is explained by the fact that any point on the circumference of a smaller circle rolling on the inside of and tangent internally to a fixed circle of twice the diameter, describes a straight-line path, which passes through the center point of and is actually the diameter of the larger fixed circle; the extent, in any one direction, of this straight-line path, which, if the motion is continued, is of a reciprocating back-and-forth type, is equal to twice the diameter of the smaller circle; the movement of this point on the circumference of the smaller circle around the center of the smaller circle being in the opposite direction of rotation from, but at the same absolute angular velocity as, the circular motion of the center of the smaller circle around the center of the larger circle. These geometric relations constitute a theorem, long established in mathematics, but never before successfully applied in a commercial, practical way, to the conversion of reciprocating motion to rotary motion as in steam engines, internal combustion engines, etc., or the converse as in plunger pumps, compressors, etc.

The following parts and conditions regarding same are embraced in each and every motion conversion mechanism herein described. A sleeve is rotatably mounted on a crank pin of the crank of a crankshaft which is supported on bearings. One or more eccentric sheaves and a pinion are rigidly fixed to the sleeve and an eccentric strap is operatively mounted on each eccentric sheave. The eccentricity or throws of all eccentric sheaves fixed to the sleeve are made equal to the throw of the crank. The pinion on the sleeve is operatively connected through intermediate gearing with an internal gear, which is mounted in a fixed position concentric with and normal to the axis of the crankshaft, the pitch diameters of the internal gear, pinion and intermediate gearing being made such that the sleeve, pinion and eccentric sheaves rotate at the same absolute angular velocity as, but in the opposite direction of rotation from, that of the crankshaft. The pitch diameter of the pinion is made greater than twice the throw of the crank. The axis or axes of rotation of all intermediate gearing operatively connecting the pinion and fixed internal gear rotate around the axis of the crankshaft in the same direction and at the same angular velocity as that of the crankshaft.

In the accompanying drawings, which illustrate two embodiments of the invention.

Fig. 2a is a vertical longitudinal section through the crankshaft, taken on the line IIa—IIa of the diagrammatic Fig. 5a, showing the modified arrangement of the crank pin, pinion, combination ring gear and internal fixed gear diagrammatically illustrated in Figs. 4a, 5a and 6a;

Figure 1:
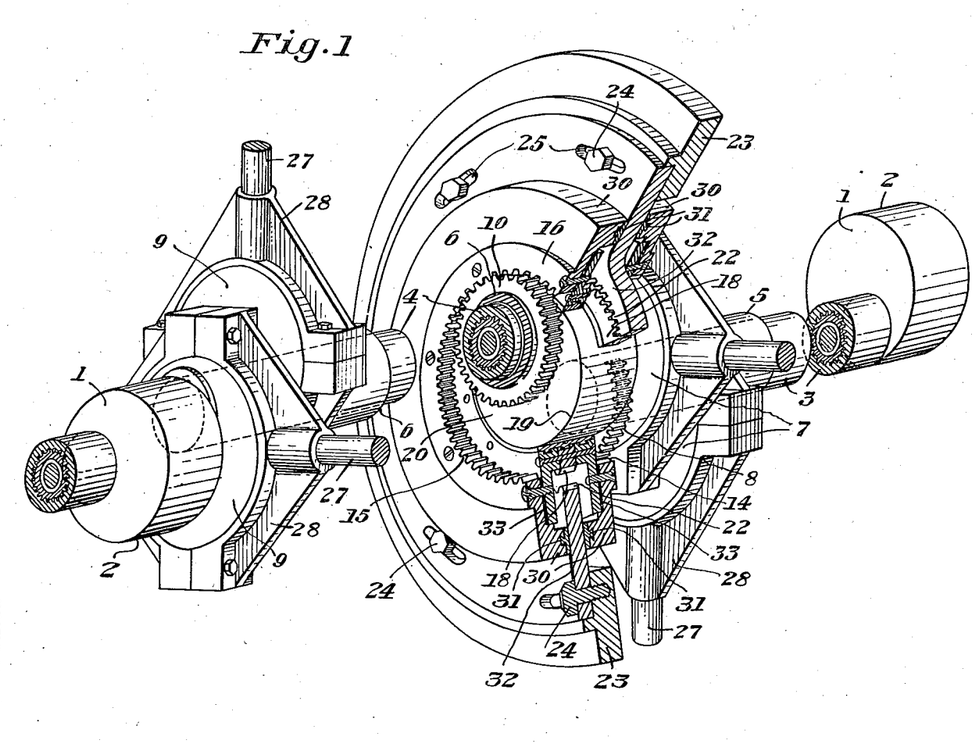
Fig. 1 is a perspective view of one form of motion conversion mechanism, parts being cut-away and shown in section for clearness.
Figure 2:
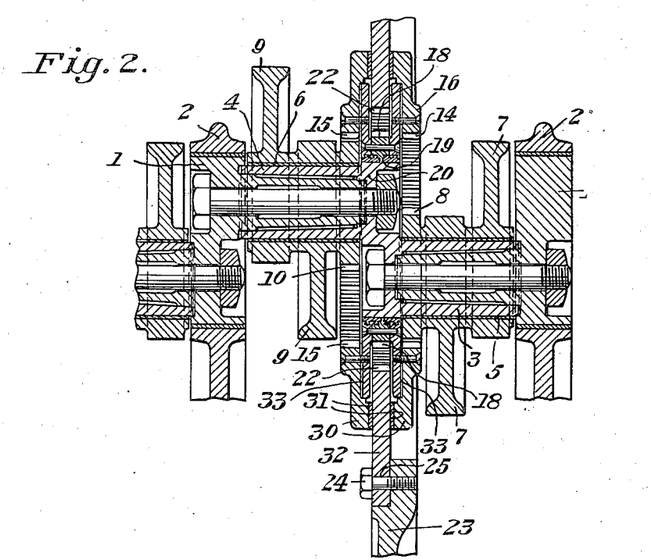
Fig. 2 is a vertical longitudinal section through the crankshaft showing the associated mechanism.
Figure 3:
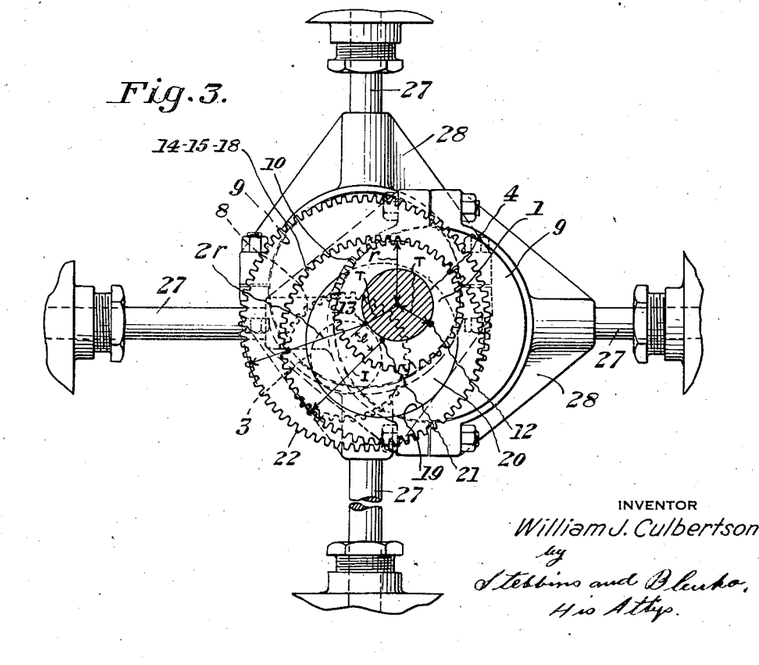
Fig. 3 is a diagrammatic view of a transverse section through the crankshaft, illustrating the associated mechanism.

Referring now more particularly to the embodiment illustrated in Figs. 1, 2 and 3, a built-up type single or multi-throw crankshaft 1, supported by main bearings 2 mounted in the crankcase, has two crank pins 3 and 4. Sleeves 5 and 6 are rotatably mounted respectively on the crank pins 3 and 4. The throws T of the crank pins 3 and 4 are made equal. Two eccentric sheaves 7, each having an eccentricity or throw T equal to the throw T of the crank pin 3 are made integral with or rigidly fastened to the sleeve 5. A pinion 8 is likewise made integral with or rigidly fastened to the sleeve 5. Two eccentric sheaves 9, each having an eccentricity or throw T equal to the throw T of the crank pin 4, are made integral with or rigidly fastened to the sleeve 6. A pinion 10 is likewise made integral with or rigidly fastened to the sleeve 6. The pitch diameters of pinions 8 and 10 are made equal, one to the other, but greater than twice the throw T of the crank pins. The pinion 8, together with the sleeve 5 and the eccentric sheaves 7, all being integral one with another, or rigidly fastened together to operate as one, are caused to rotate around the crank pin 3 by the rotation of the crankshaft 1. In a similar manner, rotation of the crankshaft causes the pinion 10, sleeve 6 and eccentric sheaves 9 to rotate around the crank pin 4. The absolute angular velocity of rotation of the eccentric sheaves, pinions and sleeves is made equal to, but in the opposite direction of rotation from that of the crankshaft. Because of the fact that the eccentricity of the eccentric sheaves is made equal to the throw of the crank, and the rotation of the eccentric sheaves around the crank pins is at the same absolute angular velocity as, but in the opposite direction of rotation from that of the crank pins around the axis 13 of the crankshaft, the center points 12 of the eccentric sheaves move with a simple harmonic motion in straight-line paths, which pass through the axis 13 of the crankshaft, the extent of this reciprocating movement in any one direction, which is the total stroke of the mechanism, being equal to four times the throw of the crank.

In order to constrain the rotation of the eccentric sheaves to the proper relation with respect to the rotation of the crankshaft, the pinions 8 and 10 are meshed respectively with the internal gear portions 14 and 15 of a combination idler ring gear 16. This combination idler ring gear 16, which is composed of internal side gears 14 and 15 and a central external gear 18, said parts being rigidly fastened together to operate as one, is rotatably mounted on the periphery 19 of an eccentrically located circular shaped web or check 20 of the crankshaft between adjacent crank throws. The center point 21 of the circular web 20, which is likewise the axis of rotation of the combination idler ring gear 14—15—18 is positioned eccentrically with respect to the axis 13 of the crankshaft, the extent of this eccentricity being designated as e in Fig. 3. The central external gear portion 18 of the combination idler ring gear 14—15—18 is meshed with a fixed stationary internal gear 22, which is mounted in a position concentric with and normal to the axis 13 of the crankshaft and rigidly attached to the crank case in a manner which will prevent tangential movement or displacement of the internal gear 22 in the crank case during operation, but which will permit slight adjustment of the position of the gear 22 in its crank case mounting, in a tangential direction about the axis 13, for the purpose of correcting any possible mis-alignment of the piston rod movement resulting from gear tooth wear. As shown in Figs. 1 and 2, the gear 22 is fastened to the crank case 23 with cap screws 24, the bolt holes 25 being slotted to permit such adjustment.

The pitch diameters 2 I of each of the internal side gears 14 and 15 are made equal one to another and likewise equal to the pitch diameter 2 I of the central external gear 18 of the combination ring gear 16. The pitch diameter 2r of each of the pinions 8 and 10 is equal to one-half the pitch diameter 4r of the fixed concentric internal gear 22 and may be made any amount greater than twice the crank throw T. Inasmuch as the combination ring gear 14—15—18 is rotatably mounted on the eccentrically located web 20 of the crankshaft 1, rotation of the crankshaft in one direction causes the combination ring gear 14—15—18 to rotate in the opposite direction, since this ring gear is meshed with the fixed stationary internal gear 22. Rotation of this eccentrically mounted combination ring gear 14—15—18 around the crankshaft in a direction opposite to that of the crankshaft likewise causes the rotation of the pinions 8 and 10, said pinion rotation likewise being in a direction opposite to that of the crankshaft, since ring gear 14—15—18 and pinions 8 and 10 are meshed together. Pinions 8 and 10 are, therefore, driven by the combination ring gear 14—15—18, acting in the capacity of an intermediate idler gear between said pinions 8 and 10, on the one hand, and the fixed internal gear 22, on the other hand, rotation being caused by the movement of the crankshaft and the combination ring gear 14—15—18 eccentrically mounted thereon, around the axis of the crankshaft.

Inasmuch as the combination ring gear 14—15—18 acts in the capacity of an intermediate idler gear, which does not affect the gear ratio relationship between the pinions 8 and 10 and the fixed internal gear 22, and in view of this 1:2 pitch diameter relationship between the pinions 8 and 10, on the one hand, and the fixed internal gear 22, on the other hand, the absolute angular velocity of each of the pinions 8 and 10 is equal to but in the opposite direction of rotation from that of the crankshaft 1. Therefore, the center point 12 of each eccentric sheave will reciprocate in a straight-line path which passes through the axis 13 of the crankshaft.

The forces or thrust of one or a plurality of coaxial pistons located in tandem or in opposed positions on each side of the motion conversion mechanism, or in any angular position around the crankshaft or a combination of such, are received by and transmitted through the reciprocating gear, piston rods 27 to the eccentric straps 28, thence through the eccentric sheaves 7 and 9 and sleeves 5 and 6 to the crank pins 3 and 4 of the crankshaft 1, power being taken from the crankshaft 1 at one or both ends, or at a point between the ends of the same. Inasmuch as the center point 12 of each eccentric sheave moves with a simple harmonic motion in a straight-line path passing through the axis 13 of the crankshaft, a path which coincides with or is symmetrical to the center line of the piston rods and which is coaxial with the center line of the pistons, the straight-line piston rod path being normal to the eccentric sheaves and their axes 12, there can be no side thrust exerted by the pistons or the piston rods 27 on any portion of the cylinder walls or stuffing boxes.

There is a twisting action exerted on the combination idler ring gear 14—15—18 caused by the presence of two force couples, each made up of a pair of equal but opposite parallel forces which are present in the transmission of the stresses, by the combination ring gear, between the pinions 8 and 10, on the one hand, and the fixed internal gear 22, on the other hand, the one force member of each couple being the gear tooth load applied between the pinions 8 or 10 and the internal side gears 14 and 15 respectively, the other member of each couple being an equal tooth load applied by the external central gear 18 to the stationary concentric internal gear 22, which is attached to the crankcase 23.

This twisting action present in the combination ring gear 14—15—18 is completely counteracted and compensated for, and the movement of the ring gear constrained to a true plane normal to the axis 13 of crank rotation, through the provision of an annular shoe 30 connected to each of the internal side gears 14 and 15. Each of these shoes 30 has a bearing 31 which slides on the side surface of the body portion 32 of the fixed internal gear 22. Shims 33, as shown in Fig. 1, are provided between the gears 14 and 15 and the gear 18 for the purpose of taking up wear and for the adjustment of the clearance between the guiding surfaces.

Figure 4:
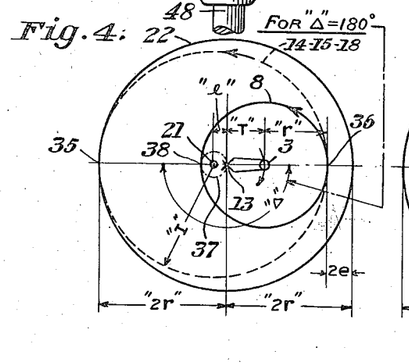
Figs. 4, 5 and 6 are diagrams, illustrating different relative positions of the crank pin, pinion, combination ring gear and internal fixed gear, showing in each case the manner in which the center point of the combination ring gear is eccentrically located with respect to the crankshaft axis, for different angular positions of said center point with respect to the crank pin.
Figures 5, 6:
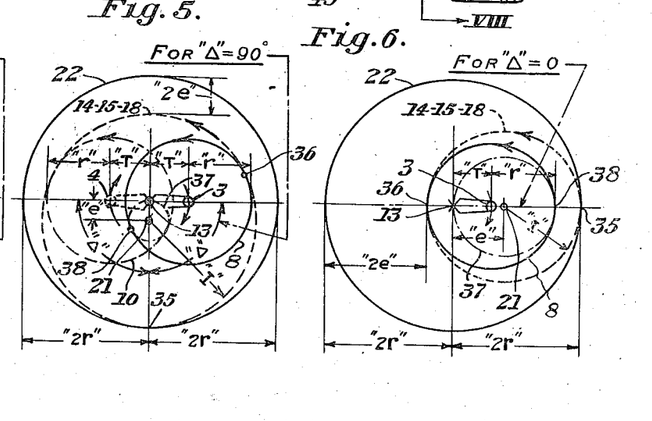

I shall refer now to Figs. 4, 5 and 6, to illustrate the manner in which the center point 21 of the combination ring gear 14—15—18 shown in Fig. 3 may be located by a graphic method in the proper eccentric position with respect to the crankshaft axis. In Figs 4, 5 and 6, parts corresponding to those illustrated in Fig. 3 have been indicated by the same reference numerals. In each of these figures, the fixed internal gear which is rigidly connected to the crankcase in a position concentric with the crankshaft axis is designated by the reference numeral 22. The combination idler ring gear which meshes externally with the fixed internal gear 22 is designated by the reference numerals 14—15—18. The pinion which meshes with the internal gear portion 14 of the combination idler ring gear 14—15—18 is indicated by the reference numeral 8. The crankshaft axis is designated as 13, the crank pin as 3 and the center point of the combination ring gear 14—15—18 is represented by the reference numeral 21.

In all of the figures, Δ is the angle between the line connecting the axis of the crank pin 3 or 4 with the crankshaft axis 13, and the line connecting the center point 21 of the combination ring gear 14—15—18 with the crankshaft axis 13. The angle Δ in Fig. 4 is 180°, in Fig. 5 is 90° and in Fig. 6 is 0°. In all of the figures, r is the radius of the pitch circles of the pinions 8 and 10, T is the throw of the cranks of crank pins 3 and 4, e is the eccentricity of the center point 21 of the combination ring gear 14—15—18 with respect to the crankshaft axis 13 and I is the radius of the pitch circles of the internal gears 14 and 15 and of the external gear 18 of the combination ring gear 14—15—18.

It will be seen from Figs. 4, 5 and 6 that, irrespective of the values of Δ, the following conditions exist. The external gear portion 18 of the combination ring gear 14—15—18 meshes, as indicated by the reference numeral 35, with the fixed internal gear 22 and the internal gear portion 14 of the combination ring gear 14—15—18 meshes, as indicated by the reference numeral 36, with the pinion 8. The center point 21 of the combination ring gear 14—15—18 is likewise the center point of a circle 37 (shown in chain lines) which passes through the axis 13 of the crankshaft and has a radius e. Furthermore, the circle 37 is internally tangent to the pitch circle of the pinion 8 (also pinion 10 in Fig. 5) at a point 38 on said pinion 8 pitch circle which is directly opposite to the point 36 of internal tangency between the pitch circles of the pinion 8 and the combination ring gear 14—15—18. In all of the figures, the center point 21 of the combination ring gear 14—15—18 rotates in the same direction and at the same angular velocity as that of the crankshaft around their common axis 13 of rotation.

In Fig. 5, I have shown two crank pins 3 and 4, on adjacent crank arms, having equal throws T and spaced 180° apart around the crankshaft axis 13 and two pinions 8 and 10 having equal pitch diameters and rotatably mounted on said crank pins 3 and 4 respectively, the pinion 8 being meshed with the internal gear portion 14 and the pinion 10 meshed with the internal gear portion 15 of the combination ring gear 14—15—18, the external gear portion 18 of said combination ring gear being meshed with the fixed internal concentric gear 22, the center point 21 of said combination ring gear being located at an angle $\Delta$ of 90° around the crankshaft axis 13 from the axis of either of the crank pins 3 or 4. Two such adjacent crank pins 3 and 4 with pinions 8 and 10 respectively mounted thereon may each be located in equal symmetrical positions on opposite sides of, and in any angular location $\Delta$ with respect to, the center point 21 of the combination ring gear 14—15—18, around the axis 13 of the crankshaft. In such cases where the angle $\Delta$ is made either zero degrees, as in Fig. 6, or one hundred eighty degrees, as in Fig. 4, the axes of the two crank pins 3 and 4 occupy identical positions around the crankshaft axis 13 or, in other words, become co-axial and lay in the same plane.

It will be seen from the above description of Figs. 4, 5 and 6 that the pitch diameter of the internal and external gear portions of the combination ring gear 14—15—18 and the location of the center point 21 of this combination ring gear 14—15—18 may be determined graphically for any desired angle $\Delta$, either in the case where only one crank pin 3 and pinion 8 are used or in the case where two adjacent crank pins 3 and 4 and two pinions 8 and 10 are used in connection with the combination ring gear 14—15—18.

Formulas are given below for the relationship of the throw T of the crank pins 3 and 4, the eccentricity $e$ of the center point 21 of the combination ring gear 14—15—18 with respect to the axis 13 of the crankshaft 1, the equal radii I of the pitch circles of the internal and external gear portions of the combination ring gear 14—15—18, and for the equal radii $r$ of the pitch circles of the pinion gears 8 and 10, for the various angular positions $\Delta$ (wherein $\Delta$ is the angle between the line connecting the crank pin axis with the crankshaft axis 13, and the line connecting the center point 21 of the combination ring gear 14—15—18 with the crankshaft axis 13).

*For values of $\Delta$ ranging from 0 degrees to 90 degrees*

$$S = T \sin(90° - \Delta)$$

$$e = \frac{T^2 - r^2}{2(S - r)}$$

$$I = 2r - e$$

$$\sin(90° - \Delta) = \frac{T^2 + 2er - r^2}{2eT}$$

*For values of $\Delta$ ranging from 90 degrees to 180 degrees*

$$S = T \sin(\Delta - 90°)$$

$$e = \frac{r^2 - T^2}{2(S + r)}$$

$$I = 2r - e$$

$$\sin(\Delta - 90°) = \frac{r^2 - 2er - T^2}{2eT}$$

Total strokes $= 4T$

In the above formulas, S is an arbitrary symbol to facilitate calculations. These formulas apply to all of the devices described in Figs. 1 through 6, either in the case where the motion conversion mechanism serves the eccentric sheave or sheaves on each of two adjacent crank throws or serves the eccentric sheave or sheaves on only one crank pin.

Referring now to the embodiment shown in Figs. 2a, 4a, 5a and 6a, the mechanism therein illustrated is a modified form of the mechanism described in Figs. 1 through 6, said modified form being similar in all respects to that previously illustrated and described in Figs. 1 through 6, with the exception of the proportioning and arrangement of the gear train, consisting of the pinions 8 and 10, the fixed concentric internal gear 22 and the combination ring gear 14—15—18, operatively connecting said pinions and internal fixed gear. All other parts of this modified form of the mechanism are identical in all respects to similar parts hereinbefore described for the mechanism illustrated in Figs. 1 through 6. Further description of such similar parts is, therefore, unnecessary and has been omitted. Due to the similarity of most of the parts shown in Figs. 1 through 6 and 2a, 4a, 5a and 6a, parts shown in Figs. 2a, 4a, 5a and 6a corresponding to similar parts illustrated in Figs. 1 through 6 have been indicated by the same numerals with the letter $a$ or $b$ suffixed.

In the mechanism illustrated in Figs. 1 through 6, the pinions 8 and 10 together with the sleeves 5 and 6, and the eccentric sheaves 7 and 9 fixed thereto are constrained to move at the same absolute angular velocity as, but in the opposite direction of rotation from that of the rotation of the crank pins 3 and 4 around the axis 13 of the crankshaft 1 by gearing in the form of a combination ring gear 14—15—18 operatively connecting the pinions 8 and 10 to the fixed concentric internal gear 22, the pitch diameters of the internal gear portions 14—15 and external gear portion 18 of the combination ring gear 14—15—18 being made equal one to another, and the pitch diameter of the fixed concentric internal gear 22 being made equal to twice that of the pinions 8 and 10.

Figure 4A:
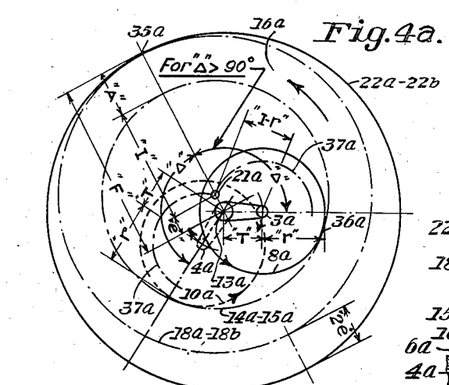
Figs. 4a, 5a and 6a are diagrams, illustrating different relative positions of a modified arrangement and proportioning of the pinon, combination ring gear and internal fixed gear, the modification being in the gear train consisting of pinion, combination ring gear and internal fixed gear, said figures showing in each case the manner in which the center point of the combination ring gear is eccentrically located with respect to the crankshaft axis, for different angular positions of said center point with respect to the crank pin.
Figure 5A:
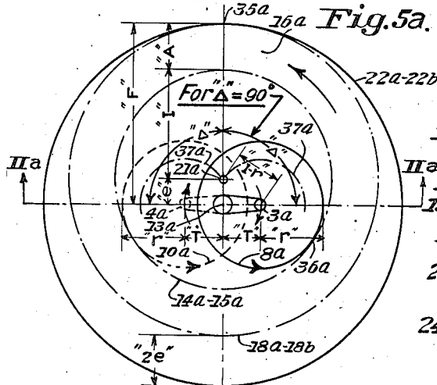
Figure 6A:
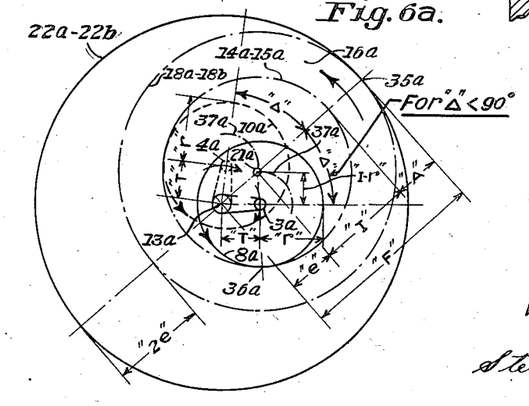

In the modified form of the mechanism illustrated in Figs. 2a, 4a, 5a and 6a, the movement of the pinions 8a and 10a, together with the sleeves 5a and 6a and the eccentric sheaves 7a and 9a fixed thereto, is constrained to an absolute angular velocity equal to, but in the opposite direction of rotation from that of the rotation of the crank pins 3a and 4a around the axis 13a of the crankshaft 1a by a gear train, or gear trains, similar in all respects to that described for the mechanism illustrated in Figs. 1 through 6, with the following exceptions: The radii (I plus A) of the pitch circles of the two external gear portions 18a—18b of the combination ring gear 16a are made equal, the one to the other, and likewise greater than the radii I of the pitch circles of the two internal gear portions 14a—15a of this combination ring gear 16a, which are likewise made equal, the one to the other, the value A representing the difference between these radii (I plus A) and I, or, in other words, the radial distance between the internal and external gear pitch circles of this combination ring gear 16a. The radii F of the pitch circles of the two fixed concentric internal gears 22a—22b are made equal, the one to the other, and likewise greater than twice the radii r of the pitch circles of the two pinions 8a and 10a, which likewise are made equal the one to the other. The various radii herein mentioned are shown in Figs. 4a, 5a and 6a.

Figure 2A:
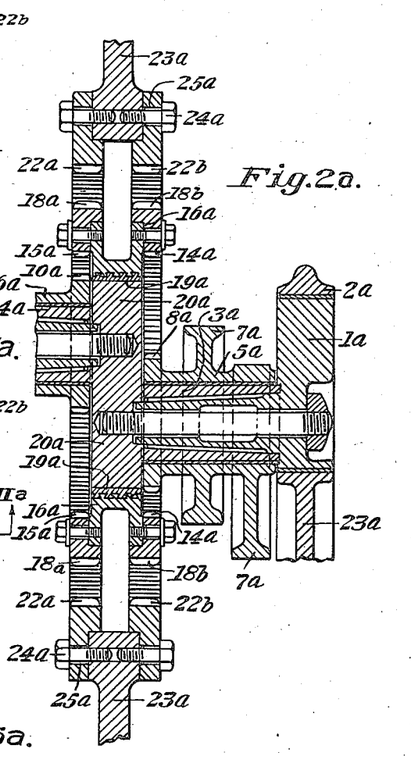

In the longitudinal sectional view of this modified mechanism illustrated in Fig. 2a, two external side gear portions 18a and 18b of the combination ring gear 16a, are shown meshed respectively with two internal fixed concentric gears 22a and 22b, the two internal side gear portions 15a and 14a of said combination ring gear 16a being meshed respectively with the two pinions 10a and 8a, the meshed gears 22a, 18a, and 15a, 10a being located substantially in the same plane normal to the axis 13a of the crankshaft 1a, the meshed gears 22b, 18b and 14a, 8a likewise being located substantially in another plane normal to the axis 13a of the crankshaft 1a. The gears 18a, 18b, 15a and 14a are fixed together to rotate as one and form the combination ring gear 16a. This manner of arranging the gears is the preferred method. However, only one external gear 18a, meshed with one internal concentric fixed gear 22a may be used, locating said gears 18a and 22a in the same plane, in a centrally located position with respect to the combination ring gear 16a and pinions 8a—10a, or in any other position, which is normal to the axis 13a of the crankshaft 1a, the gear 18a being fixed to the combination ring gear 16a.

The combination ring gear 16a, consisting of the internal 14a—15a and external 18a—18b gear portions, is rotatably mounted on the periphery 19a of an eccentrically located circular web 20a of the crankshaft 1a between crank throws in a manner similar to that described for the combination ring gear 14—15—18 of the mechanism illustrated in Figs. 1 through 6, the extent of the eccentricity of this mounting with respect to the axis 13a of the crankshaft 1a, or in other words, the distance between the center point 21a of the combination ring gear 16a, and said axis 13a, being noted as e.

Referring now to the diagrams Figs. 4a, 5a and 6a, it will be observed that the center point 21a of the combination ring gear 16a is located at some point on a circle 37a, which is concentric with the axis of the crank pin 3a, said circle 37a having a radius equal to the difference (I minus r) between the radii of the pitch circles of the internal gear portion 14a of the combination ring gear 16a and of the pinion 8a. In the event the combination ring gear 16a is to be used in connection with two crank pins 3a and 4a with two pinions 8a and 10a respectively mounted thereon, this center point 21a of the combination ring gear 16a is located at the point of intersection of the two circles 37a, each having a radius (I minus r), the one circle being concentric with the axis of the crank pin 3a, the other concentric with the axis of the crank pin 4a, the value of e in such case being the distance from this point of intersection of these two circles 37a, to the axis 13a of the crankshaft 1a.

The angular position of this center point 21a of the combination ring gear 16a with respect to the crank pin 3a, around their common axis 13a, is shown as Δ, said angular position being the same as that of the adjacent crank pin 4a located on the opposite side of, and with respect to, this center point 21a. In other words, the center point 21a is always located symmetrically with respect to the two crank pins 3a and 4a, in the event two crank pins and two pinions are used in connection with the combination ring gear 16a. Values of the radius I of the pitch circles of the internal gear portions 14a—15a, the eccentricity e of the center point 21a and the distance A between the pitch circles of the internal gear portions 14a—15a and external gear portions 18a—18b of the combination ring gear 16a are selected for any given values of the throw T of the crankshaft 1a, angular position Δ of the crank pin 3a and 4a with respect to the center point 21a, and radius r of the pitch circle of the pinion 8a and 10a, so that the combination ring gear 16a rotates in the opposite direction from that of the crankshaft 1a, at an angular velocity such that the pinions 8a and 10a, internally meshed therewith, are rotated at the same absolute angular velocity as, but in the opposite direction from that of the crankshaft 1a.

Formulas to facilitate the selection of the proper values of the various parts of the mechanism so as to constrain the movement of the pinions 8a—10a, as hereinbefore specified, are given below. These formulas express the relationship of the throw T of the cranks of crank pins 3a and 4a, the eccentricity e of the center point 21a of the combination ring gear 16a, with respect to the axis 13a of the crankshaft 1a, the radius r of the pitch circle of the pinions 8a and 10a, the radius I of the pitch circle of the internal gear portions 14a—15a of the combination ring gear 16a, the value A representing the radial distance between the pitch circles of the internal gear portions 14a—15a and the external gear portions 18a—18b of the combination ring gear 16a, the radius F of the pitch circle of the internal concentric fixed gears 22a—22b, for the various angular positions Δ (wherein Δ is the angle between the line connecting the axis of the crank pin 3a or 4a with the crankshaft axis 13a and the line connecting the center point 21a of the combination ring gear 16a with the crankshaft axis 13a).

Revolutions of the combination ring gear 16a for one revolution of the crankshaft $1a = \frac{2r-I}{I} = \frac{e}{I+A}$ $$e = \frac{2r(I+A) - AI - I^2}{I}$$

$$A = \frac{I^2 - 2rI + eI}{2r - I}$$

$$I = \sqrt[2]{2rA + \left[\frac{e+A-2r}{2}\right]^2} - \left[\frac{e+A-2r}{2}\right]$$

$$\cos \Delta = \pm \frac{T^2 + e^2 - (I-r)^2}{2Te}$$

$$F = e + I + A$$

These formulas apply to all of the devices described in Figs. 2a, 4a, 5a and 6a, either in the case where the motion conversion mechanism serves the eccentric sheave, or sheaves, on each of two adjacent crank throws, or serves the eccentric sheave, or sheaves, on only one crank pin.

The twisting action present in the combination ring gear 14—15—18 of the mechanism illustrated in Figs. 1 through 6, as a result of the force couples set-up in the transmission of the gear loads between pinions 8—10 and the combination ring gear 14—15—18 is almost completely eliminated in the combination ring gear 16a of this modified mechanism as illustrated in Fig. 2a, on account of the fact that the gear tooth forces are transmitted from the pinions to the fixed concentric internal gears through the gear trains 8a, 14a, 18b, 22b and 10a, 15a, 18a, 22a, wherein all gears of each gear train are located in substantially the same plane normal to the crankshaft axis 13a. For this reason, means have not been provided or shown in Fig. 2a to counteract any twisting action in the combination ring gear 16a of this modified mechanism. However, under certain conditions, it may be found desirable to provide such means, in which case a method similar to that shown incorporated in the combination ring gear 16 of Figs. 1 and 2, involving the use of annular shoes 30, with bearing surfaces 31 sliding on the side surfaces of a fixed guide plate 32, or other arrangement accomplishing the same purpose, may be used.

On account of the almost complete elimination of any twisting action in the combination ring gear, the simplicity of the design and freedom from restrictions in the proportioning of the various parts thereof, this modified mechanism, as illustrated in Figs. 2a, 4a, 5a and 6a, is considered the most practical and best type of the various forms of the motion conversion mechanism herein described.

Figure 7:
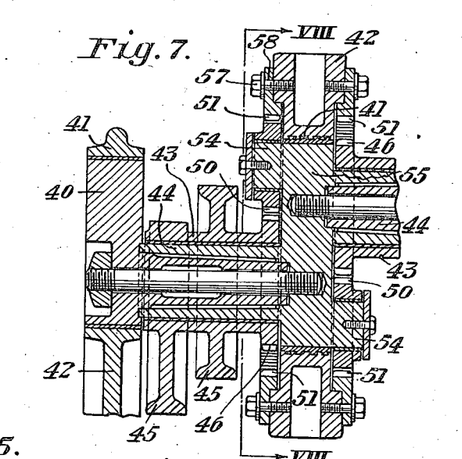
Fig. 7 is a longitudinal section through the crankshaft of another embodiment of the invention taken on the line VII—VII of Fig. 8.
Figure 8:
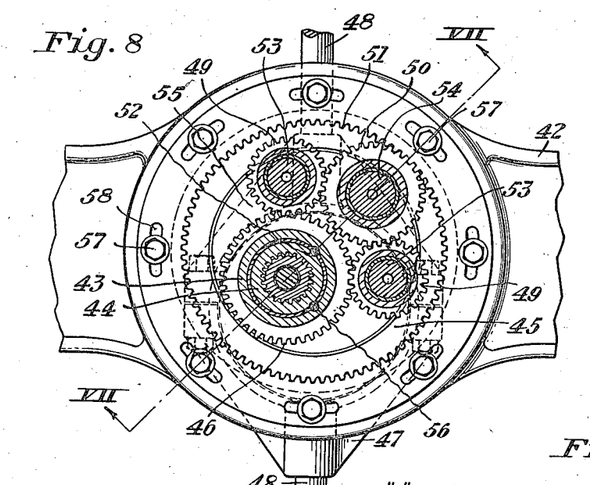
Fig. 8 is a transverse section through the crankshaft taken on the line VIII—VIII of Fig. 7.

Referring now to Figs. 7 and 8, the motion conversion mechanism shown therein is similar to that shown in Figs. 1 through 3, except that in Figs. 7 and 8 a pair of idler gears rotatably mounted on stub shafts fixed to and eccentrically located on the side of a web of the crankshaft is used for operatively connecting the pinion (pinion 8 of Fig. 2) with the fixed concentric internal gear (22 of Fig. 2) in place of the combination ring gear (16 of Fig. 2).

In the motion conversion mechanism illustrated in Figs. 7 and 8, a built-up type, single or multi-throw crankshaft 40 supported by main bearings 41 mounted in the crank case 42 has a sleeve 43 rotatably mounted on the crank pin 44. Two eccentric sheaves 45 and a pinion 46 are made integral with or rigidly fastened to the sleeve 43. The eccentric sheaves 45 are provided with eccentric straps 47, to which piston rods 48, which receive and transmit the thrust from the pistons, are attached. Power is taken from one or both ends of the crankshafts or at a point between the ends. All of the parts thus far described in connection with Figs. 7 and 8 are proportioned and arranged to operate as described for similar parts used in the mechanism illustrated in Figs. 1 through 3.

The pinion 46 is engaged through a gear train, consisting of two intermediate idler gears 49 and an idler gear 50, with a fixed stationary internal gear 51, which is fastened to the crankcase 42 in a position concentric with the axis 52 of the crankshaft. The pitch diameter of the fixed concentric internal gear 51 is made twice that of the pinion 46. The intermediate idler gears 49 and 50 are rotatably mounted on stub shafts or pins 53 and 54 respectively, which are fixed to the side surface of the adjoining crank web 55, in which position all rotate around the axis 52 of the crankshaft 40 in the same direction and at the same angular velocity as the crankshaft.

Because of the 1:2 gear ratio relationship between the pinion 46 and the stationary concentric internal gear 51, said ratio being unaffected by the presence of the idler gears 49 and 50 in this gear train, the pinion 46 will be caused to rotate at the same absolute angular velocity as, but in a direction opposite from, that of the crankshaft, rotation in the opposite direction being brought about through the use of two intermediate idler gears 49 and 50, and the center points 56 of all eccentrics will move with a simple harmonic motion in straight-line paths which pass through the crankshaft axis 52.

The stationary internal gear 51 is adjustably mounted and fastened to the crank case 42 by cap screws 57 fitted into slotted openings 58 in the gear plate of internal gear 51 in the same manner and for the same reasons as set forth in the description of Figs. 1 through 3.

It is to be understood that in all of the mechanisms herein described, reciprocatory movement may be transmitted to the eccentric strap or straps for conversion into rotary movement, as in the case of an internal combustion engine, a steam engine, etc., or rotary movement may be applied to the crankshaft for conversion into reciprocatory movement, as in the case of a plunger pump, a compressor, etc. It is to be further understood that the application and use of the mechanisms herein described is not confined to engines, compressors, pumps, etc., but may be used wherever it is desired to convert reciprocating movement into rotary movement and vice versa.

In all of the forms of the driving gear mechanisms embodying the invention as previously described, a built-up, de-mountable type crankshaft has been specified in the descriptions and illustrated in the various figures. This is the preferred type for use in these drive gear mechanisms. However, a solid, one-piece type of crankshaft, with split type eccentric sheaves, split sleeves and sleeve bearings, could be used in these mechanisms, if so desired. Crankshafts used in these mechanisms may be either of the single or multi-throw type.

In the particular form of built-up crankshaft shown in the different figures, the main crankshaft journals are actually circular shaped web members between adjacent crank throws, these web members being made concentric with the axis of the crankshaft and made sufficiently large to completely surround and include the crank pins in their side surfaces, the main bearing journal surfaces being the peripheral face portions of these circular webs. Such a design is made practicable by the fact that the throw of the crank used in the driving gear mechanisms, is only one-half of that required in the usual connecting rod-and-crank type of driving gear, having a total piston stroke equal to that of these drive gear mechanisms. It is, therefore, possible to employ this type of main crankshaft journal design in these mechanisms without making it necessary to increase the diameter of these main bearings beyond practical limits or greatly in excess of that required for the usual connecting rod-and-crank type of drive gear having an equivalent piston stroke, etc. Such a main bearing design makes possible a substantial reduction in the total length of the crankshaft, at the same time materially increasing both its strength and stiffness.

In all of the forms of these motion conversion mechanisms herein described, perfect balance of all operating parts may be obtained by first balancing the sleeve and the masses it carries, such as eccentric sheaves, about the axis of the crank pin and then balancing the whole assembly of sleeve, eccentric sheaves, crank pins, crank webs and unbalanced reciprocating forces, said balancing being accomplished by the proper attachment of suitable masses in the form of counterweights, to the crankshaft and to the reciprocating members.

In the device shown in Figs. 1 through 3, 2a, 4a, 5, 5a and 6a, I have shown two pinions 8 and 10 on adjacent crank pins 3 and 4 meshed with two internal gears 14 and 15, both of which are connected to an external gear 18, the gears 14, 15, 18 comprising the combination ring gear 16. I may, however, use only one internal gear, such as the gear 14 of Fig. 2, and one external gear, such as the gear 18 of Fig. 2, and one fixed internal gear, such as the gear 22 of Fig. 2, and one pinion, such as the pinion 8 of Fig. 2, where the device is intended to serve only one crank pin. The arrangement shown is advantageous, however, in that it permits a reduction in the number of necessary moving parts and likewise permits a reduction in the length of the crankshaft.

A further characteristic and advantage of these mechanisms lies in the fact that the straight-line path of the center points of the eccentric sheaves (point 12 of Fig. 3, or point 56 of Fig. 8); and therefore, the center line of all pistons, cylinders, etc. connected thereto, may be placed in any angular position around the axis of the crankshaft, provided same is made normal to and passes through this axis of the crankshaft.

A further characteristic and advantage of all these mechanisms lies in the fact that the diameter of the crank pins is not limited in relation to the throw of the cranks, as is the case in many existing straight-line motion conversion mechanisms, such as those wherein the pitch diameter of the eccentric driving pinion, which is mounted on a sleeve on the crank pin, is made equal to the stroke of the crank, the eccentric pinion engaging an internal fixed gear, made concentric with the crankshaft axis and having a pitch diameter twice that of the pinion. Since in these previous existing mechanisms, the pitch diameter of the pinion is made equal to the crank stroke, the diameter of the crank pin, upon which this pinion and sleeve are mounted, must of necessity be made less than this crank stroke by an amount approximately equal to the sum of the depth of the gear teeth plus twice the thickness of the sleeve. For example, in a device of the type under discussion, which has a total piston rod stroke of 4 inches and a crank stroke of 2 inches, and assuming a tooth depth of ¼ inch and a sleeve thickness of ⅜ inch, the maximum possible diameter of the crank pin under such conditions would be 2″—¼″—⅜″—⅜″ or 1″, which is, obviously, a size far below the normal requirements in this regard.

A still further characteristic and advantage of all these mechanisms lies in the fact that the torque available at the main drive shaft may be changed between wide limits by simply changing the pitch diameter of the eccentric drive pinion (such as pinions 8 or 10 of Fig. 2) and of the other gearing meshed therewith, as needed to maintain their specified relationship, one with another, but without changing the thrust load delivered to the piston rod and without changing the stroke of the crank. The torque at the main drive shaft of these mechanisms may thus be made any selected amount, below two times but above one times that delivered by a simple orthodox "connecting-rod-and-crank" drive, having a crank throw equal to that of the crank used in the motion conversion mechanism, the connecting rod of the simple crank drive being considered to be of infinite length in calculating the torque, the piston loading in each case being the same.

The equivalent stroke ($E_s$) of a simple orthodox "connecting-rod-and-crank" type of driving gear, having a connecting rod assumed to be of infinite length, which will deliver the same torque at the drive shaft, under the same piston load conditions as that delivered by these motion conversion mechanisms, may be expressed as follows:

$$E_s = \frac{2T}{r} \times (T + r)$$

Where T equals the throw of the crank and r equals the radius of the pitch circle of the eccentric driving pinion as in Figs. 3, 4, 5, 6, 4a, 5a, 6a. As an example: Assume the throw T of the crank of the mechanism is 1½″, and the radius r of the pitch circle of the eccentric driving pinion is 2¼″, then $$E_s = \frac{2 \times 1\frac{1}{2}}{2.25} \times (1.5 + 2.25) = 5''$$

It is evident from this formula that, if the value of T, which is the radius of the crank circle, is kept constant, the value of $E_s$ is diminished as the value of r is increased. In other words, with the throw T of the crank of the mechanism constant, the torque, delivered at the drive shaft of the mechanism, decreases as the pitch diameter of the eccentric drive pinion (such as pinion 8 of Fig. 2) is increased.

In view of this characteristic, the pitch diameter selected for the eccentric drive pinions in all of the mechanisms, which are intended for use in connection with pumps, air compressors and other machines, wherein power is applied to the drive shaft and converted into reciprocating motion, should be made large in relation to the stroke of the crank pin, in order to reduce the torque requirements at the drive shaft. On the other hand, the pitch diameter selected for the eccentric drive pinions of all mechanisms which are intended for use in connection with power generating equipment, such as internal combustion engines, steam engines and other machines, wherein force is applied to the pistons, piston rods, etc., and converted into useful work in the form of rotary motion at the drive shaft, should be made as small as possible in relation to the stroke of the crank, within the limits of practical design, but never made equal to or less than said stroke of the crank, in order to increase the torque available at the main drive shaft.

If the pitch diameter selected for the eccentric drive pinion of any of these mechanisms were to be made an amount equal to the stroke of the crank, the need for the provision of gearing operatively connecting the pinions with the fixed concentric internal gear by means of the combination ring gear (Figs. 1 through 6, 2a) or the idler gears (Figs. 7 and 8) would be eliminated and the pinion would then, under such conditions, be of proper size to mesh directly with a fixed concentric internal gear having a pitch diameter twice that of the pinion, the same as in other existing mechanisms. The pitch diameter of the pinion used in all mechanisms herein described has been specified as any selected amount greater than the stroke of the crank, in order to attain the improvements and advantages as described.

These various mechanisms may be used to advantage in connection with radial type engines and opposed cylinder type engines, pumps, etc., especially if co-axial cylinders, with opposed-pistons, connected by a common, one-piece, rigid connecting rod or articulated link and master rod, are used. These mechanisms may likewise be used advantageously in connection with opposed-piston, single or double-acting, co-axial tandem cylinder type engines.

On account of the back-lash present, to a greater or lesser degree, in all gear drives, there is a slight side-play present in all pistons which are directly and rigidly connected by relatively short piston rods to the eccentrics, of all mechanisms herein described; this side-play being caused by the slight mis-alignment of the path of the eccentric movement, resulting from the relative movement, back-lash, of the mating gear teeth, one tooth within the other. The extent of this side-play of the piston rod is in proportion to the amount of the operating clearance provided between the mating gear teeth, and varies in its effect from zero, when the piston rod is at mid-stroke, to a maximum, when the piston rod is at either end of the stroke.

In view of these conditions, it is sometimes desirable to provide an articulated type of connection between pistons and eccentrics, which are to be directly connected by relatively short piston rods, one to the other, in all mechanisms wherein roughly finished or poorly fitted gears are used. In the case of co-axial opposed cylinder engines with gears of such type, the pistons may be connected directly to each other, through a common eccentric on the centrally located crankshaft, by a master-rod and articulated link type of connection. In the event only one piston is to be directly connected to the eccentric of such an engine, an articulated link type of connection may be used. In all such cases, a jointed connection, (wrist pin), should be provided between the piston rods and the pistons.

In all mechanisms wherein closely fitted, highly accurate and finished gearing is employed, such as the kind of gears used in the best aircraft engines, the extent of this "back-lash" and resulting mis-alignment and side-play of the pistons, piston rods, etc., is negligible and may be disregarded. Under such conditions, the rigid piston rod type of connection between piston rod and eccentric strap and between piston rod and piston may be used, without detrimental effects or increase in the frictional losses. The usual clearance provided between the pistons and cylinder walls should be sufficient to "take-up" the negligible side-play present under such conditions, thereby relieving the pistons of any possible side thrust resulting from same.

The invention is not limited to the preferred embodiments, which have been given merely for illustrative purposes, but may be otherwise embodied or practiced within the scope of the following claims.

I claim:

1. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter at least twice the pitch diameter of said pinion, said internal gear being mounted in a fixed position concentric with and normal to the axis of the crankshaft, and means operatively connecting said pinion and internal gear, so that said pinion rotates at the same absolute angular velocity as, but in the opposite direction from that of the crankshaft.

2. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter at least twice the pitch diameter of said pinion, said internal gear being mounted in a fixed position concentric with and normal to the axis of the crankshaft, and means operatively connecting said pinion and internal gear, so that said pinion rotates at the same absolute angular velocity as, but in the opposite direction from that of the crankshaft, said means being located eccentrically with respect to the axis of the crankshaft.

3. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter at least twice the pitch diameter of said pinion, said internal gear being mounted in a fiixed position concentric with and normal to the axis of the crankshaft, and a combination gear meshing internally with said pinion and externally with said fixed internal gear so that said pinion rotates at the same absolute angular velocity as, but in the opposite direction from that of the crankshaft.

4. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter at least twice the pitch diameter of said pinion, said internal gear being mounted in a fixed position concentric with and normal to the axis of the crankshaft, a combination gear located eccentrically with respect to the axis of the crankshaft, said combination gear meshing internally with the pinion and externally with said fixed internal gear, so that said pinion rotates at the same absolute angular velocity as, but in the opposite direction from that of the crankshaft.

5. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter at least twice the pitch diameter of said pinion, said internal gear being mounted in a fixed position concentric with and normal to the axis of the crankshaft, a pair of gears, one gear of said pair meshing with said fixed internal gear and the other gear of said pair meshing with said pinion, the two gears of said pair being fixed to each other so as to rotate together, said pair of gears being located eccentrically with respect to the crankshaft axis, so that said pinion rotates at the same absolute angular velocity as, but in the opposite direction from that of the crankshaft.

6. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter at least twice the pitch diameter of said pinion, said internal gear being mounted in a fixed position concentric with and normal to the axis of the crankshaft, a pair of gears, one gear of said pair meshing with said fixed internal gear and the other gear of said pair meshing with said pinion, the two gears of said pair being fixed to each other so as to rotate together, said pair of gears being located eccentrically with respect to the crankshaft axis and operatively and rotatably mounted on the periphery of a web of the crankshaft, so that said pinion rotates at the same absolute angular velocity as, but in the opposite direction from that of the crankshaft.

7. Motion conversion mechanism, comprising a crankshaft supported on bearings, two adjacent crank pins on crank arms of said crankshaft, a sleeve rotatably mounted on each of said crank pins, an eccentric sheave and a pinion rigidly fixed to each of said sleeves, a strap operatively mounted on each of said eccentric sheaves, the eccentricity of each eccentric sheave on each crank pin being equal to the throw of each of the crank arms, the pitch diameter of both of the pinions being made equal and likewise greater than twice the throw of the crank arm, an internal gear having a pitch diameter at least twice the pitch diameter of said pinion, said internal gear being mounted in a fixed position concentric with and normal to the axis of the crankshaft, an internal ring gear meshing with each of said pinions, said internal ring gears having equal pitch diameters, both gears being fixed to an external ring gear meshing with said internal fixed concentric gear, said three ring gears being operatively and rotatably mounted on the periphery of a web of the crankshaft in an eccentric position between adjacent crank throws, so that said pinions rotate at the same absolute angular velocity as, but in the opposite direction from, that of the crankshaft.

8. Motion conversion mechanism, comprising a crankshaft supported on bearings, two adjacent crank pins on crank arms of said crankshaft, a sleeve rotatably mounted on each of said crank pins, an eccentric sheave and a pinion rigidly fixed to each of said sleeves, a strap operatively mounted on each of said eccentric sheaves, the eccentricity of each eccentric sheave on each crank pin being equal to the throw of each of the crank arms, the pitch diameter of both of the pinions being made equal and likewise greater than twice the throw of the crank arm, two internal gears having equal pitch diameters, said pitch diameters being greater than twice the pitch diameters of the pinions, each of said internal gears being mounted in a fixed position concentric with and normal to the axis of the crankshaft, and in the same plane as the corresponding pinion, two combination ring gears, each consisting of an internal gear and an external gear fixed to each other so as to rotate together, the internal gear portions meshing with said pinions and the external gear portions meshing with the corresponding fixed concentric internal gears, the pitch diameters of the internal gear portions of the two combination ring gears being made equal and likewise less than the pitch diameters of the external gear portions of these combination ring gears which, in turn, are made equal, each combination ring gear being located in substantially the same plane as the corresponding pinion and fixed concentric internal gear with which it is meshed, the two combination ring gears being fixed together and operatively and rotatably mounted on the periphery of a web of the crankshaft in an eccentric position with respect to the axis of the crank shaft between adjacent crank throws, the pitch diameters of the pinions, combination ring gears and fixed concentric internal gears being made such that said pinions rotate at the same absolute angular velocity as, but in the opposite direction from that of the crankshaft.

9. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter at least twice the pitch diameter of said pinion, said internal gear being mounted in a fixed position concentric with and normal to the axis of the crankshaft, a combination ring gear meshing internally with said pinion and externally with said fixed internal gear, and a shoe fixed to one of said elements of combination ring gear and fixed internal gear and sliding on the other of said elements.

10. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter substantially twice the pitch diameter of said pinion, said internal gear being mounted in a fixed position concentric with and normal to the axis of the crankshaft, a combination ring gear meshing externally with said fixed internal concentric gear and internally with said pinion, the gears of said combination ring gear having substantially the same pitch diameter, the center point of said combination ring gear being the center point of a circle which passes through the axis of the crankshaft and is internally tangent to the pitch circle of said pinion at a point on said pinion pitch circle directly opposite to the point of tangency between the pitch circles of said pinion and combination ring gear, said center point of the combination ring gear rotating in the same direction and at the same angular velocity as that of the crankshaft.

11. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter greater than twice the pitch diameter of said pinion, said internal gear being mounted in a fixed position concentric with and normal to the axis of the crankshaft, a combination ring gear consisting of an internal gear and an external gear fixed to each other so as to rotate together, the internal gear portion meshing with the pinion, the external gear portion meshing with the fixed concentric internal gear, the pitch diameter of the external gear portion of said combination ring gear being greater than the pitch diameter of the internal gear portion of said combination ring gear, the center point of said combination ring gear being located eccentrically with respect to the crankshaft axis and likewise at a point on a circle which is concentric with the axis of the crank pin, said circle having a radius equal to the difference between the radii of the pitch circles of the internal gear portion of the combination ring gear and of the pinion, said center point of the combination ring gear rotating in the same direction and at the same angular velocity as that of the crankshaft, the pitch diameters of the pinion, the internal and external gear portions of the combination ring gear and fixed concentric internal gear being made such that said pinion rotates at the same absolute angular velocity as, but in the opposite direction from that of the crankshaft.

12. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter at least twice the pitch diameter of said pinion, said internal gear being mounted in a fixed position concentric with and normal to the axis of the crankshaft, and a train of gears operatively connecting said pinion and fixed concentric internal gear, so that said pinion rotates at the same absolute angular velocity as, but in the opposite direction from that of the crankshaft.

13. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter substantially twice the pitch diameter of said pinion, said internal gear being mounted in a fixed position concentric with and normal to the axis of the crankshaft, and a pair of idler gears rotatably mounted on stub shafts fixed to and eccentrically located on a web of the crankshaft, one of said idler gears meshing with said pinion, the other of said idler gears meshing with said internal gear and with said other idler gear.

14. Motion conversion mechanism, comprising a crankshaft supported on bearings, a crank pin on a crank arm of said crankshaft, a sleeve rotatably mounted on said crank pin, an eccentric sheave and a pinion rigidly fixed to said sleeve, a strap operatively mounted on said eccentric sheave, the eccentricity of the eccentric sheave on the crank pin being equal to the throw of the crank arm, the pitch diameter of said pinion being greater than twice the throw of the crank arm, an internal gear having a pitch diameter greater than twice the pitch diameter of said pinion, said internal gear being mounted in a fixed position concentric with and normal to the axis of the crankshaft, a combination gear consisting of an internal gear and an external gear fixed to each other so as to rotate together and both located substantially in the same plane, the internal gear portion meshing with the pinion, the external gear portion meshing with the fixed concentric internal gear, the combination gear being operatively and rotatably mounted in an eccentric position with respect to the axis of the crankshaft, the combination gear, the pinion and the fixed concentric internal gear all being located in substantially the same plane, so that said pinion rotates at the same absolute angular velocity as, but in the opposite direction from that of the crankshaft.

WILLIAM J. CULBERTSON.